UNITED STATES PATENT OFFICE.

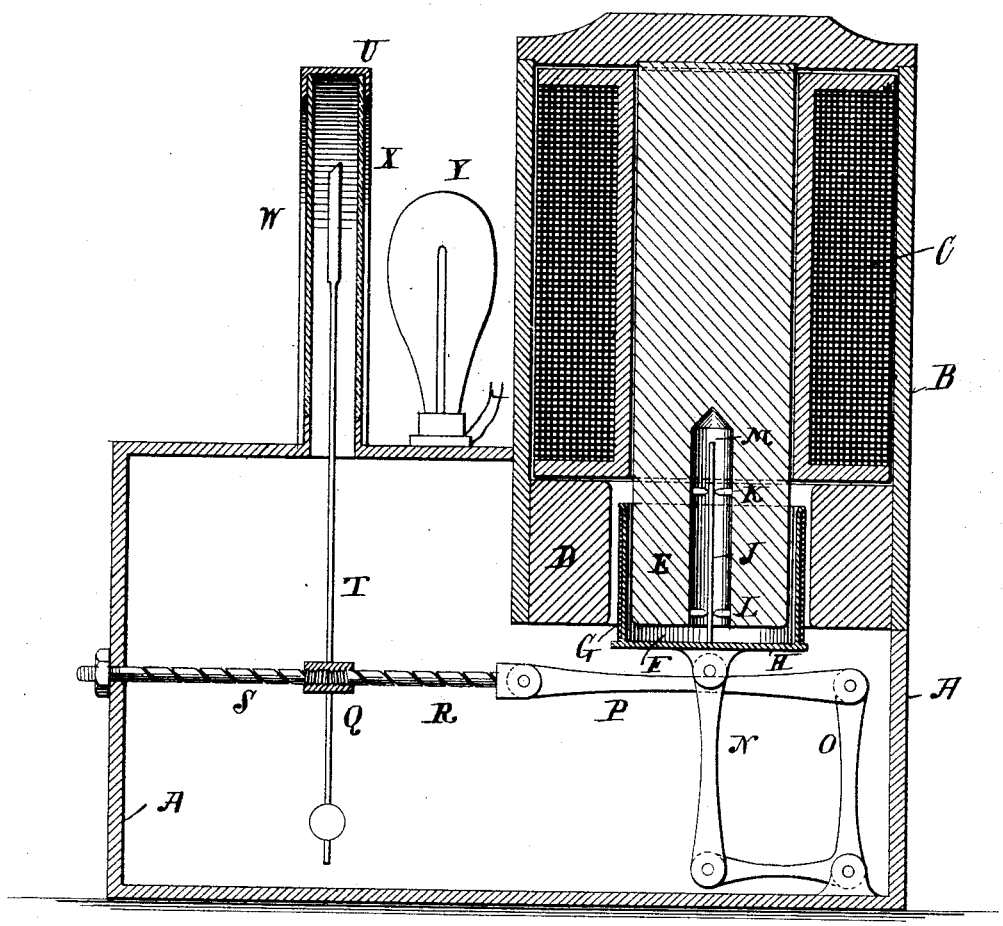

EDWARD WESTON, OF NEWARK, NEW JERSEY.

ELECTRICAL MEASURING INSTRUMENT.

SPECIFICATION forming part of Letters Patent No. 473,538, dated April 26, 1892.

Application filed January 8, 1891. Serial No. 377,088. (No model.)

*To all whom it may concern:*

Be it known that I, EDWARD WESTON, of Newark, Essex county, New Jersey, have invented a new and useful Improvement in Electrical Measuring Instruments, of which the following is a specification.

My invention relates to an instrument for measurement of differences of potential in electric current; and it consists more particularly in the construction and arrangement of the indicating device, in which the scale-plate is made of a translucent material, so that it may be illuminated by a light placed behind it, and thus rendered visible at a considerable distance from the apparatus.

My invention further consists in a box or case inclosing the index or pointer, having one of its walls formed of translucent material, on which the scale is inscribed, the said scale being visible through an opening in the opposite wall of the case, which is closed with a plate of glass.

The accompanying drawing is a vertical section of an electrical measuring instrument with which my device is embodied.

A is a box or case receiving the cylindrical shell B, which incloses the coil C.

D and E are pole-pieces of the electro-magnet so formed.

F is a cylinder of light metal, which is surrounded by a coil G.

Connected to the cylinder-head H is a rod J, which passes up through jeweled guides K L in the opening M in the pole-piece E. Pivoted also to the cylinder-head H is a forked piece N, which connects with the horizontal arm of the bell-crank lever O. The other arm of said lever is pivoted to a link P, to which is secured one end of the spiral spring R. The other end of said spiral spring is fastened to a short threaded rod, which is received in the collar Q. Another spiral spring S is provided with a threaded rod, which also enters the collar Q and is fastened at its other extremity by a nut, as shown, to the wall of the case A. Supported on the collar Q and extending vertically upward is the counterweighted index-needle T.

In the cover U of the case A there is an opening, through which the needle T extends, and above this opening there is a circular frame V, in which are set two plates of glass W and X. On one of these plates of glass X is inscribed the scale-marking, and this plate of glass is ground or made partly translucent. Placed between the case U and the inclosing cylinder B is an incandescent electric lamp Y, which serves to illuminate the translucent scale-plate X. This lamp is connected with any independent source of electricity. The coils C and G are connected in series.

The operation of the instrument is as follows: When the current, the potential of which is to be measured, is passed through the coils C and G, the cylinder F is moved upward or downward and its motion is transmitted through the links and bell-crank lever to the springs R S. The springs then rotate, carrying with them the sleeve R and causing the needle T to move in front of the scale. By reason of the illumination of the scale the movement of the index-needle may easily be perceived and is visible from a considerable distance.

I may vary the before-described construction of the scale-plate in various ways. Thus I may use a scale-plate of semi-translucent material—such as ground glass—in one wall and a plate of clear glass in the other, or instead of inscribing the scale-marking on the ground-glass plate I may inscribe it on the clear-glass plate, or I may use two plates of clear glass, or I may make both plates semi-opaque and recognize the position of the needle by its shadow on one plate viewed from the exterior, in which case the scale-marking will be on the outside plate.

It will be apparent from the preceding that the box or case A of the instrument incloses both the working mechanism and the needle hermetically, so that although it is necessary to bring the needle outside of the main case in order to provide for the transparent scale and the arrangement of the light behind it, yet, nevertheless, the hermetically-sealed case prevents any possible ingress of dust to the mechanism.

I claim—

1. In combination with the working mechanism of an electrical measuring instrument, an index or needle actuated by said mechanism, a box or case wholly inclosing said index and inserted in one of the walls of said case, and a plate of translucent material inscribed with a scale-marking appropriate to the instrument, over which scale said index moves.

2. In combination with the working mechanism of an electrical measuring instrument, an index or needle actuated by said mechanism, a box or case wholly inclosing said index and inserted in one of the walls of said case, a plate of translucent material inscribed with a scale-marking appropriate to the instrument, over which scale said index moves, and in the opposite wall a plate of glass or other transparent material.

3. In combination with the working mechanism of an electrical measuring instrument, an index or needle actuated by said mechanism, a box or case hermetically inclosing both said index and said mechanism and inserted in one of the walls of said case, a plate of translucent material inscribed with a scale-marking appropriate to the instrument, over which scale said index moves, and in the opposite wall a plate of glass or other transparent material.

4. In combination with the standard of an electrical measuring instrument, the case U, containing the translucent dial X, the movable needle T, and the electric lamp Y, supported in rear of said dial and transmitting light through the same.

EDWARD WESTON.

Witnesses:
M. BOSCH,
JAMES T. LAW.